United States Patent [19]

Abe

[11] Patent Number: 5,774,208
[45] Date of Patent: Jun. 30, 1998

[54] COAXIAL ELECTRO-OPTICAL DISTANCE METER

[75] Inventor: Mitsutaka Abe, Atsugi, Japan

[73] Assignee: Sokkia Co., Ltd., Tokyo, Japan

[21] Appl. No.: 612,448

[22] Filed: Mar. 7, 1996

[30] Foreign Application Priority Data

Jun. 19, 1995 [JP] Japan .................................. 7-151922

[51] Int. Cl.$^6$ ........................................................ G01C 3/08
[52] U.S. Cl. ........................... 356/4.01; 356/5.01; 356/5.1
[58] Field of Search .................................. 356/4.01, 5.01, 356/5.15

[56] References Cited

U.S. PATENT DOCUMENTS 3,698,812  10/1972  Nelson ........................................ 356/5

FOREIGN PATENT DOCUMENTS 4-319687  11/1992  Japan .

*Primary Examiner*—Stephen C. Buczinski
*Attorney, Agent, or Firm*—Armstrong, Westerman, Hattori, McLeland & Naughton

[57] ABSTRACT

A coaxial electro-optical distance meter has optical elements on light transmitting side which are located behind an objective lens such that light from a light transmitting member is reflected from a first reflecting surface disposed adjacent to an optical axis of the objective lens. The reflected light is emitted as transmitted light to a reflecting member disposed ahead of the objective lens. Optical elements on light receiving side are arranged such that received light from the reflecting member is reflected from a second reflecting surface disposed behind the first reflecting surface for guiding it to a light receiving member disposed beside the optical axis. The first reflecting surface is disposed such that the optical axis is positioned inside a luminous flux of the transmitted light. The cross section of the luminous flux of the transmitted light is reformed into a point-asymmetrical shape by a diaphragm plate having an opening therein for passing therethrough light from the light transmitting member.

7 Claims, 3 Drawing Sheets

COAXIAL ELECTRO-OPTICAL DISTANCE METER

BACKGROUND OF THE INVENTION

1. Field of the Invention

The present invention relates to a coaxial electro-optical distance meter in which there are coaxially disposed optical means on light transmitting side for transmitting or sending light via an objective lens which constitutes a collimating optical system, i.e., a telescopic optical system, and optical means on light receiving side for receiving light incident via the objective lens, both being of an electro-optical distance meter.

2. Description of Related Art

A conventional electro-optical distance meter has the following construction. Namely, modulated light is transmitted or sent from a light source via optical means on the light transmitting side, the modulated light is reflected from a target, a phase difference between a received signal obtained by receiving the reflected light by a detector via optical means on the light receiving side and a reference signal obtained from the light source is measured, and a distance to the target is measured by the phase difference. However, if a corner prism (or a corner reflector) is used to reflect highly parallel transmitted light, the luminous flux of the transmitted light and the luminous flux of the received light as reflected overlap completely. As a result, there will occur a case in which the received light fails to reach the optical means on the light receiving side and, consequently, the distance measurement cannot be made. As a solution to this kind of problem, there is known an electro-optical distance meter, for example, in Japanese Published Unexamined Patent Application No. 319687/1992 in which the luminous flux of the transmitted light is disposed away from the optical axis of the objective lens such that the optical path of the transmitted light and the optical path of the received light lie parallel with each other, whereby they do not overlap each other.

In the above-described conventional electro-optical distance meter in which the optical path of the transmitted light and the optical path of the received light are arranged not to overlap each other, there is the following disadvantage. Namely, when the electro-optical distance meter is positioned right opposite to the reflecting member and, consequently, the optical axis of the objective lens and the central axial line of the reflecting member precisely coincide with each other, the optical path of the transmitted light and the optical path of the received light may be positioned opposite to each other on both sides of the optical axis. However, when the electro-optical distance meter is not precisely opposite to the reflecting member, the optical path of the transmitted light and the optical path of the received light may sometimes overlap each other, with the result that the distance measurement cannot be made.

Further, when a reflecting sheet is used as a reflecting member instead of a corner prism, the received light is reflected by dispersion to some degree. Therefore, there will be no such a possibility that the distance measurement cannot be made due to complete overlapping of the transmitted light and the received light. However, because the luminous flux of the transmitted light is away from the optical axis, if the reflecting sheet is inclined, there may sometimes occur a positional deviation in the longitudinal (i.e., back and forth) direction between a collimating point, which is the crossing point between the reflecting sheet and the optical axis, and a point at which the transmitted light is reflected. This deviation becomes an error in the measurement.

SUMMARY OF THE INVENTION

In view of the above-described disadvantages, the present invention has an object of providing a coaxial electro-optical distance meter which gives rise to neither incapability of measuring nor measuring error.

In order to attain the above and other objects, the present invention provides a coaxial electro-optical distance meter comprising: optical means on light transmitting side located behind an objective lens such that light from a light transmitting member is reflected from a first reflecting surface disposed adjacent to an optical axis of the objective lens for emitting it as transmitted light to a reflecting member disposed ahead of the objective lens; optical means on light receiving side arranged such that received light reflected from the reflecting member is reflected from a second reflecting surface disposed behind the first reflecting surface for guiding it to a light receiving member disposed beside the optical axis; wherein the first reflecting surface is disposed such that the optical axis is positioned inside a luminous flux of the transmitted light; and wherein the optical means on light transmitting side further comprises reforming means for reforming a cross section of the luminous flux of the transmitted light into a point-asymmetrical shape.

Preferably, the optical means on the light-transmitting side is formed in a first prism and the optical means on light receiving side is formed in a second prism. The first reflecting surface is formed in an inclined surface of a first prism for transmitting light by passing through the first prism and the second reflecting surface is formed in a rear of the inclined surface.

The second reflecting surface may also be formed in the inclined surface of the first prism and the first reflecting surface may be formed in a rear of the first prism.

Preferably, the reforming means comprises a diaphragm plate having an opening therein for passing therethrough light from the light transmitting member.

The opening in the diaphragm plate may be trapezoidal, triangular, star-shaped, or of a water-drip shape.

The reforming means may also comprise reflecting surface means having a reflecting surface of relatively simple shape such as a trapezoid and a triangle.

If a corner prism is used as the reflecting member, the cross section of the luminous flux of the transmitted light attains a point-symmetrical relationship with the luminous flux of the received light. Therefore, by making the cross section of the luminous flux of the transmitted light into a point-asymmetrical shape, the luminous flux of the transmitted light and the luminous flux of the received light do not overlap completely even if the optical path of the transmitted light and the optical path of the received light may coincide with each other. Instead, a part of the received light always reaches the light receiving member via the optical means on light receiving side. Further, if the optical axis is arranged to be positioned inside the luminous flux of the transmitted light, even in case a reflecting sheet is used as the reflecting member, there will occur no error due to the inclination of the reflecting sheet by coinciding the collimating position with the reflecting position of the transmitted light.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF PREFERRED EMBODIMENTS

Figure 1:
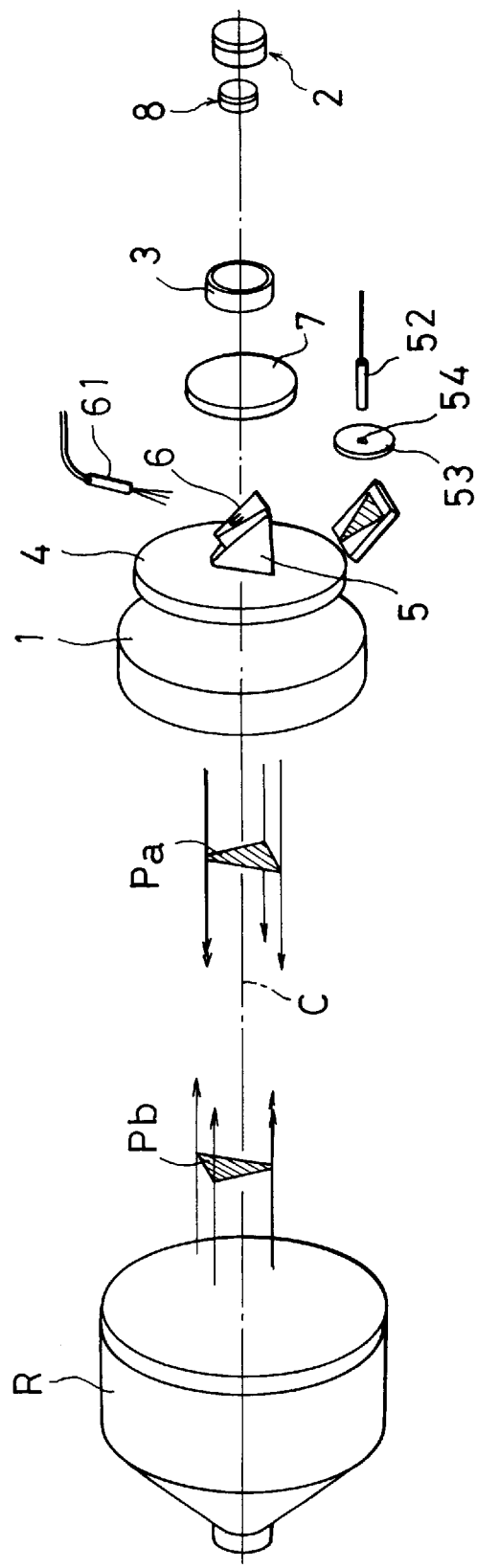
FIG. 1 is an exploded schematic view showing the arrangement of one embodying example of the present invention.
Figure 2:
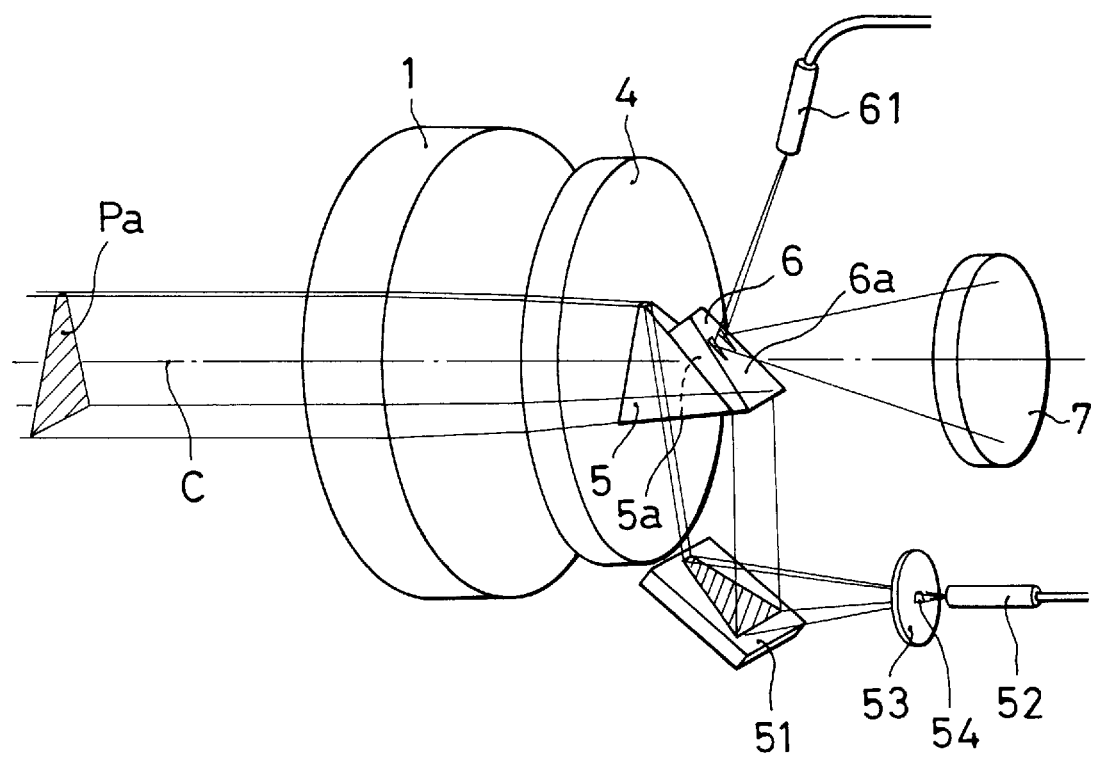
FIG. 2 is a schematic view showing the detailed shape of prisms.

Referring to FIGS. 1 and 2, reference numeral 1 denotes an objective lens. Behind (i.e., to the right in FIG. 1) this objective lens 1 and on an optical axis C of the objective lens 1, there are provided an eyepiece 2, as well as a focal lens 3 which is positioned between the objective lens 1 and a focusing plate 8 which is located in front (i.e., to the left in FIG. 1) of the eyepiece 2. It is thus so arranged that a telescope is constituted by the objective lens 1, the eyepiece 2, the focusing lens 3 and the focal plate 8 so that an arbitrary point along an extension line of the optical axis C, which is a line connecting the center of the objective lens 1 and the center of the focal plate 8, can be collimated. There is further provided a disklike (or a disk-shaped) transparent prism-holding plate 4 behind the objective lens 1. On the rear surface of the prism-holding plate 4 there is adhered a first prism 5, and a second prism 6 is further adhered to the first prism 5. Between these prisms 5, 6 and the focusing lens 3 there is disposed a disklike dichroic mirror 7. This dichroic mirror 7 has a function of penetrating visible light but selectively reflecting a light wave of light that is radiated from a light transmitting (or a light emitting) member 52 to be described hereinbelow.

The first prism 5 is provided with an inclined reflecting surface 5a which lies inside the prism and which crosses the optical axis C. Below the reflecting surface 5a there is provided a light transmitting member 52 in an optically opposite manner via a reflecting mirror 51. Between the light transmitting member 52 and the reflecting mirror 51 there is disposed a diaphragm plate 53 which has a trapezoidal opening 54 therein. Therefore, among the light to be transmitted from the light transmitting member 52, that portion of the light which passes through the trapezoidal opening 54 is reflected from the reflecting mirror 51 and is then reflected from the reflecting surface 5a of the first prism 5 for further emitting as the transmitted light Pa through the objective lens 1 towards a corner prism R which is disposed ahead of the objective lens 1. The cross section of the luminous flux of the transmitted light Pa is in a trapezoidal shape which is similar to the above-described trapezoidal opening 54, and the optical axis C lies within the luminous flux of the transmitted light Pa.

In the second prism 6 there is formed an inclined reflecting surface 6a which is an outside surface of the second prism 6. The received light Pb which is reflected from the corner prism R passes through the position in which the first prism 5 is disposed, and is thereafter reflected from the dichroic mirror 7, and is further reflected from the reflecting surface 6a. The received light Pb is thus arranged to become incident on a light receiving member 61 which lies in an opposite relationship with the reflecting surface 6a.

Figure 3:
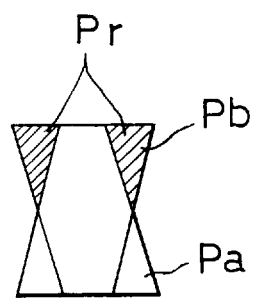
FIG. 3 is a diagram showing the condition in which transmitted light and received light partly overlap.

By the way, if the corner prism R is used as the reflecting member as described above, the cross section of the luminous flux of the transmitted light Pa and the cross section of the luminous flux of the received light Pb are in a point-symmetrical relationship with each other. In this embodying example, since the cross section of the luminous flux of the transmitted light Pa is in a trapezoidal shape, the received light Pb becomes an inverse trapezoidal shape in which the right and left and the top and bottom are reversed, respectively. On the other hand, if the optical axis C is made to coincide with the central axial line of the corner prism R, and if the transmitted light Pa is reflected at the central portion of the corner prism R, the optical path of the transmitted light Pa and the optical path of the received light Pb coincide with each other. However, since the trapezoid is of a point-asymmetrical shape, in whatever manner the transmitted light Pa and the received light Pb may overlap as shown in FIG. 3, a part Pr of the transmitted light Pa is sure to reach the dichroic mirror 7 without overlapping the transmitted light Pa and is further reflected from the reflecting surface 6a, so that a part of the received light Pb becomes incident on the light receiving member 61.

Figure 4:
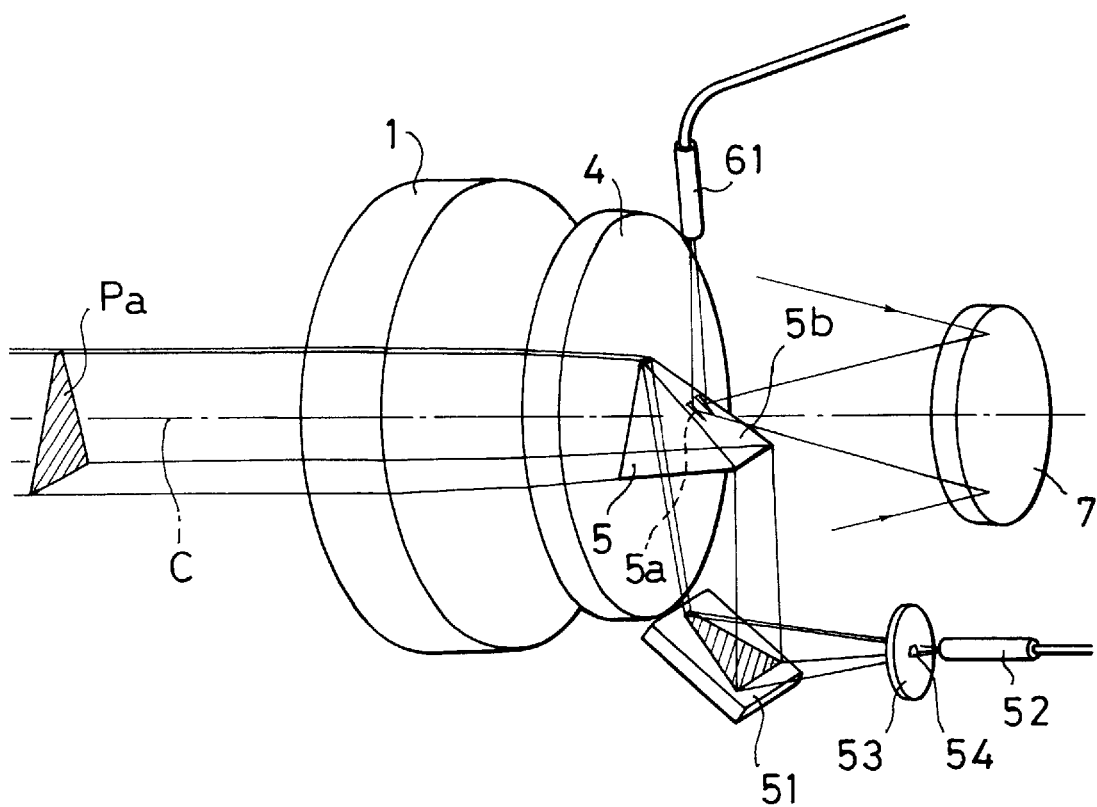
FIG. 4 is a schematic view showing the detailed shape of a prism in a second embodying example of the present invention.

In the above-described embodying example, the second prism 6 was adhered to the first prism 5. However, the following arrangement may also be employed. Namely, as shown in FIG. 4, by using only the first prism 5 and by causing the outside of the inclined surface in which the reflecting surface 5a is formed to function as the reflecting surface 5b, the received light Pb or a part Pr of it is reflected from the reflecting surface 5b, instead of from the above-described reflecting surface 6a, so that the received light Pb or a part Pr of it becomes incident on the light receiving member 61.

Figure 5:
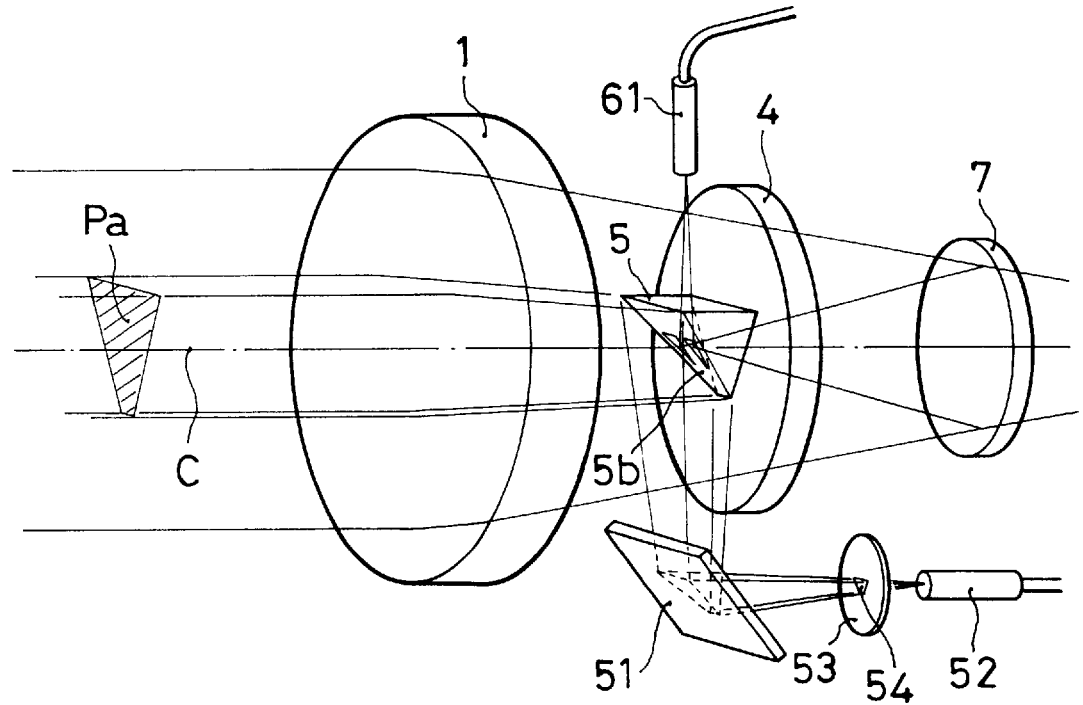
FIG. 5 is a schematic view showing the detailed shape of a prism in a third embodying example of the present invention.

Furthermore, the following arrangement may also be employed. Namely, as shown in FIG. 5, the prism-holding plate 4 shown in FIG. 4 is reversed inside out so that the prism 5 is positioned on the side of the objective lens 1. The light for transmission as reflected from the reflecting mirror 51 is thus reflected from the reflecting surface 5b which is the outside surface of the prism 5 to make it the transmitted light Pa. The received light Pb reflected from the dichromic mirror 7 is reflected from the reflecting surface 5a, which is the inner surface, so that it becomes incident on the reflecting member 61.

In each of the above-described embodying examples, the cross section of the luminous flux of the transmitted light Pa is formed into a trapezoidal shape. However, as long as it is in point-asymmetrical shape, the shape may also be other than trapezoidal; it may, for example, be triangular, pentagonal, star-shaped, or of a water drip shape. If the above-described shape is relatively simple such as trapezoidal or triangular, the diaphragm plate 53 may be omitted; instead, the shape of the reflecting surface 5a (5b in FIG. 5) may be formed into a trapezoidal or triangular shape so that the cross section of the luminous flux of the transmitted light Pa may be triangular or trapezoidal.

Since the present invention has the above-described arrangement, the distance measurement does not become impossible even when a corner prism is used as the reflecting member and, therefore, the distance measurement becomes always possible. Further, since an arrangement is made that the optical axis of the objective lens is inside the luminous flux of the transmitted light, there will occur no error even if the reflecting sheet may be inclined when the reflecting sheet is used as the reflecting member.

It is readily apparent that the above-described electro-optical distance meter meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A coaxial electro-optical distance meter comprising:

optical means on a light transmitting side located behind an objective lens such that light from a light transmitting member is reflected from a first reflecting surface disposed adjacent to an optical axis of said objective lens and emitted through said objective lens as transmitted light to a reflecting member disposed ahead of said objective lens;

optical means on a light receiving side arranged such that received light reflected from said reflecting member is reflected from a second reflecting surface, disposed adjacent said optical axis, to a light receiving member;

wherein said first reflecting surface is disposed such that said optical axis is positioned inside a luminous flux of said transmitted light; and wherein said optical means on the light transmitting side includes reforming means for reforming a cross section of said luminous flux of said transmitted light into a point-asymmetrical shape.

2. A coaxial electro-optical distance meter according to claim 1, wherein said optical means on the light transmitting side includes a first prism and said optical means on light receiving side includes a second prism.

3. A coaxial electro-optical distance meter according to claim 1, wherein said first reflecting surface is an interior of an inclined surface of a first prism for transmitting the light through said first prism and wherein said second reflecting surface is an exterior of said inclined surface.

4. A coaxial electro-optical distance meter according to claim 1, wherein said second reflecting surface is an interior of an inclined surface of a first prism and said first reflecting surface is an exterior of said inclined surface.

5. A coaxial electro-optical distance meter according to any one of claims 1 through 4, wherein said reforming means comprises a diaphragm plate having an opening therein for passing therethrough light from said light transmitting member.

6. A coaxial electro-optical distance meter according to claim 5, wherein said opening is trapezoidal, triangular, pentagonal, star-shaped, or of a water-drip shape.

7. A coaxial electro-optical distance meter according to any one of claims 1 through 4, wherein said reforming means comprises reflecting surface means having a shaped reflecting surface.

* * * * *